United States Patent [19]

Wahl et al.

[11] Patent Number: 5,180,564
[45] Date of Patent: Jan. 19, 1993

[54] PROCESS FOR THE PRODUCTION OF AN AQUEOUS SUSPENSION OF HYDROXYLAPATITE

[75] Inventors: Friedrich Wahl, Mannheim; Andrea Maurer-Rothmann, Weinheim; Karl Merkenich, Fuerth/Fahrenbach, all of Fed. Rep. of Germany

[73] Assignee: BK Ladenburg GmbH, Ladenburg, Fed. Rep. of Germany

[21] Appl. No.: 796,254

[22] Filed: Nov. 22, 1991

[30] Foreign Application Priority Data

Nov. 22, 1990 [DE] Fed. Rep. of Germany ....... 4037103

[51] Int. Cl.$^5$ .............................................. C01B 25/32
[52] U.S. Cl. ..................... 423/309; 423/308; 423/311
[58] Field of Search .................... 423/309, 311, 308

[56] References Cited

U.S. PATENT DOCUMENTS

| 3,387,925 | 6/1968 | Vanstrom et al. | 423/311 |
| 4,274,879 | 6/1981 | Irvine | 106/39.5 |
| 4,324,772 | 4/1982 | Conn et al. | 423/309 |
| 4,448,758 | 5/1984 | Nagai et al. | 423/309 |
| 4,849,193 | 7/1989 | Palmer et al. | 423/309 |

Primary Examiner—Wayne Langel
Attorney, Agent, or Firm—Foley & Lardner

[57] ABSTRACT

A process for the production of an aqueous suspension of hydroxylapatite from calcium hydroxide or calcium oxide, and phosphoric acid in which, while stirring, phosphoric acid is slowly added to an aqueous solution or suspension of the calcium compound up to a calcium/phosphorus mole ratio of 10:6, wherein the course of the reaction and the achievement of the end point of the reaction is determined by the conductivity of the solution or suspension. The process results in the production of essentially pure hydroxylapatite, which is useful as, for example, a teeth cleaning agent, a bone-replacement, or as a carrier material for pharmaceutical compositions.

19 Claims, 3 Drawing Sheets

PROCESS FOR THE PRODUCTION OF AN AQUEOUS SUSPENSION OF HYDROXYLAPATITE

BACKGROUND OF THE INVENTION

The present invention is concerned with an improved process for the production of an aqueous suspension of hydroxylapatite from calcium hydroxide or calcium oxide, and phosphoric acid.

Hydroxylapatite (Ca$_5$(OH)(PO$_4$)$_3$), hereinafter also referred to as HAP, is used to a very large extent as a teeth cleaning agent, as a bone replacement material, and as a carrier material in the pharmaceutical industry. The production of this product, which is very sparingly soluble in water, usually takes place by the precipitation of aqueous solutions or suspensions of calcium compounds, for example calcium hydroxide, calcium carbonate, or calcium chloride, with a stoichiometric amount of phosphoric acid or of a soluble phosphate at a pH value of from 9.5 to 11. For economic reasons, the preferred process is thereby the reaction of quicklime in aqueous suspension with phosphoric acid which is as highly concentrated as possible according to the following reaction:

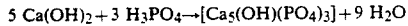

$$5\ Ca(OH)_2 + 3\ H_3PO_4 \rightarrow [Ca_5(OH)(PO_4)_3] + 9\ H_2O$$

It is a problem in the case of this reaction that, on the one hand, the concentration of the lime milk is very difficult to exactly determine since, as a technical product, the lime milk is not normally exactly definable and contains, for example, variable amounts of calcium carbonate and water. On the other hand, the precipitating out of the hydroxylapatite, unreacted calcium hydroxide can easily be entrained or, due to an excess of phosphoric acid, tricalcium phosphate can be co-precipitated as impurity.

Furthermore, it is desirable that the hydroxylapatite is obtained as a finely divided suspension and is not obtained in a lumpy condition due to too rapid precipitation, since only then is a satisfactory further working up ensured. However, this finely divided suspension cannot be filtered or can only be filtered with difficulty. Thus, dry powder must be obtained therefrom by spray drying or in vacuum driers. All impurities contained in the solution are thereby passed over into the end product. Therefore, it is necessary to start from starting materials which are as pure as possible and to carry out the reaction exactly up to the theoretical end point.

U.S. Pat. No. 4,324,772 discloses that a finely divided hydroxylapatite can be produced by passing 80% phosphoric acid into an approximately 30% solution of lime milk with vigorous stirring until a pH value of 9.5 to 11, especially of 10 to 11, and preferably of 10.5, is achieved and subsequently, in a second step, by the further addition of phosphoric acid, there is adjusted a pH value of 7.0 to 7.4 and preferably of 7.2 to 7.3. In this way, in the first step, there is only achieved a reaction of from 70 to 90%, the reaction being completed in the second step of the reaction, a finely divided hydroxylapatite thereby being obtained. The control of the pH value and the speed of stirring are thereby stated to be extraordinarily critical since, due to slight deviation of the pH value from 10.5 or due to incomplete stirring, calcium hydroxide can easily be included in the precipitated product and then, in the case of further reaction with phosphoric acid, can no longer react. The precise maintenance of the pH conditions thereby proves to be difficult because the pH measurement in the suspension obtained is very difficult. Furthermore, the two-step process is not economical.

U.S. Pat. No. 4,274,879 describes a continuous process for the production of hydroxylapatite in which an approximately 20% solution of lime milk is reacted with a 90% phosphoric acid solution at a temperature of 80° to 85° C. and at a controllable pH value of 9.5 to 10.5, whereby, in the case of a residence time of about 1 hour in a flow-through reactor, there results a hydroxylapatite with "less than 5% orthophosphate" (more correctly β-tricalcium phosphate). Here, too, the precise pH measurement is problematical and a product results which cannot be used for many technical processes.

Therefore, there is a need to find a simpler and better controllable process for the production of pure hydroxylapatite.

SUMMARY OF THE INVENTION

It is an object of the present invention to provide a method for producing an aqueous suspension of hydroxylapatite which overcomes the problems of the prior art processes.

It is further an object of the invention to provide an essentially pure hydroxylapatite which is not contaminated with dicalcium phosphate, calcium oxide, or tricalcium phosphate.

In accomplishing the foregoing objectives there has been provided, in accordance with one aspect of the present invention, a process for the production of an aqueous suspension of hydroxylapatite comprising the steps of:

a) forming in a vessel, an aqueous solution or aqueous suspension of a calcium compound selected from the group consisting of calcium hydroxide and calcium oxide, b) admixing phosphoric acid with said solution or suspension so as to form a second solution or suspension, so that the calcium/phosphorus mole ratio is up to about 10:6, whereby said phosphoric acid and said calcium compound react to form hydroxylapatite, and c) measuring the conductivity of said second solution or suspension throughout the reaction process of said step b), so as to determine the progress of the reaction and the completion of the reaction.

In accordance with another object of the present invention there has been provided an essentially pure hydroxylapatite produced by the foregoing method.

Further objects, features, and advantages of the present invention will become apparent from the detailed description of preferred embodiments that follows.

BRIEF DESCRIPTION OF THE DRAWINGS

The present invention will now be described in more detail with reference to the accompanying drawings.

DETAILED DESCRIPTION OF THE PREFERRED EMBODIMENTS

According to a preferred embodiment of the present invention, the admixing of the phosphoric acid is ended after the conductivity has decreased to less than 10% and more preferably to less than 5% of the initial value.

Furthermore, the obtained aqueous suspension of hydroxylapatite may optionally be subsequently adjusted with phosphoric acid to a pH value of 7.0 to 7.5.

According to the present invention, calcium hydroxide or calcium oxide, i.e., quicklime or CaO, is slurried in water to preferably give a 20 to 40% (wt./vol.) suspension and placed in a mixing kettle with a coolable or heatable mantle or appropriate thermostatable coils. Into this suspension, the phosphoric acid is introduced portion wise or continuously, preferably in the form of a 60 to 85% aqueous acid in the course of 1 to 5 hours. The course of the reaction and the achievement of the end point is, on the one hand, measured according to the prior art on the basis of the pH value of the solution and, on the other hand, according to the present invention, on the basis of the conductivities. Both values were corrected by the simultaneous measurement of the temperature.

Since, an especially finely divided hydroxylapatite is desired, it has proven to be advantageous to continuously draw off a part of the reaction mass from the mixing vessel, for example via a run-off on the bottom, and additionally to grind the drawn off reaction mass by means of an appropriate mill, for example a bead mill, before returning the reaction mass to the reaction vessel. At the same time, this part stream can naturally also serve for carrying out the pH and conductivity measurements. It is, of course, also possible to carry out these measurements in a separate part stream or directly in the reaction vessel.

The reaction is preferably carried out at a temperature of from about 40° to about 90° C. and more preferably of from about 50° to about 80° C., whereby, because of the high evolution of heat of the neutralization reaction, the mixing vessel must be appropriately cooled.

The suspension obtained is then dried in a known manner, for example by spray drying or vacuum drying, in order to obtain the hydroxylapatite as a dry fine powder. When the hydroxylapatite is to be used as an additive for toothpastes, it is desirable to stabilize the hydroxylapatite suspension by adding to the aqueous suspension obtained, an amount of glycerol or of some other stabilizing agent corresponding approximately to the solid material. Since usually the suspension is to have a higher solids material content, i.e., about 30 to about 50%, than is obtained in the case of the reaction according to the present invention, i.e., about 15 to about 35%, water is evaporated off to such an extent that the solid material achieves the desired concentration. In this form, the suspension is still readily flowable and stirrable and thus can be worked up.

Figure 1:
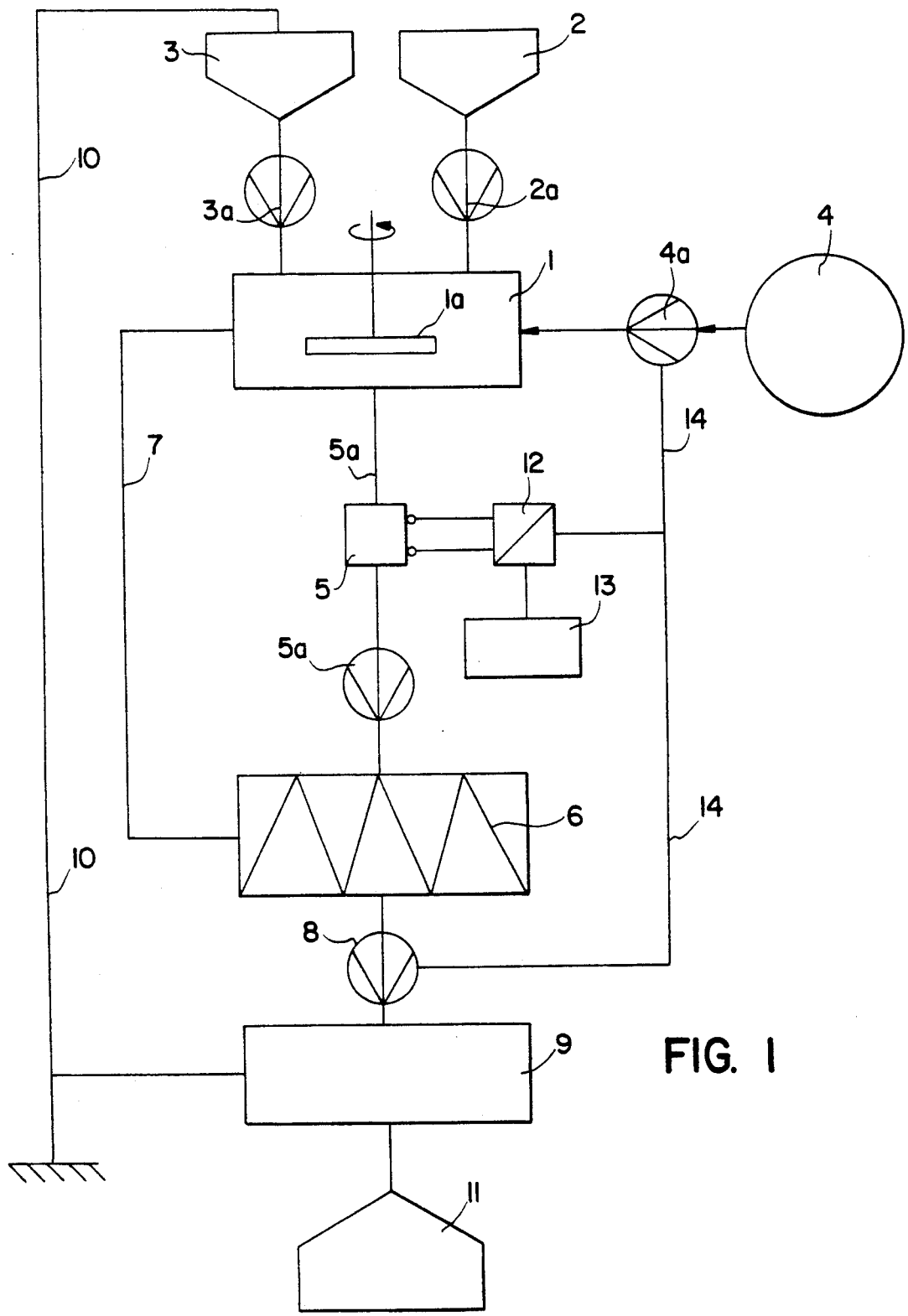
FIG. 1 shows the reaction scheme of the reaction of phosphoric acid with calcium hydroxide and a schematic device for carrying out the reaction.

Referring to FIG. 1, for the production of hydroxylapatite, into a reaction container 1 is placed calcium hydroxide from a storage container 2 and water from a reservoir 3 and mixed with phosphoric acid from a storage container 4. A portion of the suspension is continuously run off via a measurement cell 5, in which the pH value, the conductivity, and the temperature of the suspension are measured, into a mill 6 and, after grinding, again pumped back via a return pipe 7 into the reaction vessel 1. After the ending of the reaction, the suspension is passed via a pipe 8 into a centrifuge 9 and the water substantially separated off and either returned via a pipe 10 into the storage container 3 or discarded. The solid residue of hydroxylapatite is dried and transferred to a collection vessel 11. In this way, there are produced powdered hydroxylapatite and water.

With 1a is designated a stirring device placed in the reactor and with 2a, 3a and 4a the particular pipes, each provided with valves or conveyor means, from the storage containers to the reaction vessel. From the reaction vessel, a part of the suspension is passed via a conveyor means and a pump 5a through the measurement cell 5 to the mill 6. The sensors of the measurement cell 5 pass on their measurement data to the measurement value calculation device 12 which, on the one hand, records the data via a recorder 13 and, on the other hand, via control lines 14, controls the regulation devices 4a and 8. As soon as the conductivity in the measurement cell 5 falls below a predetermined value, the dosing device 4a is closed via the control pipe 14 and the conveyor pipe 8 is opened, the suspension thereby being passed to the solid-liquid separation device 9, for example, a thrust centrifuge or a drier, from which a portion of water is returned via the conveyor pipe 10 to the storage container 3 or is discarded and the solid material, possibly after an additional drying, is transferred to a storage container 11.

Figure 2:
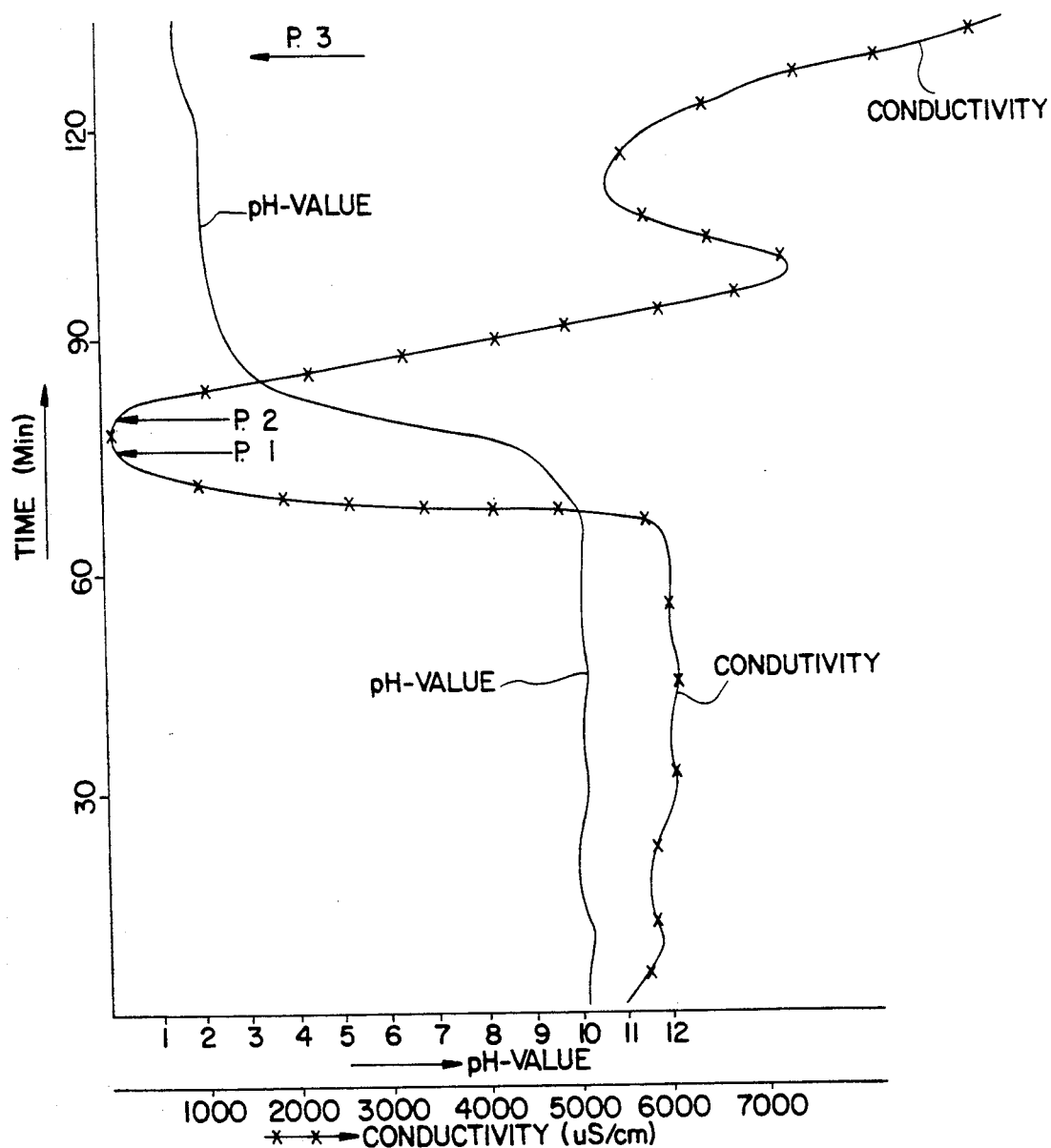
FIG. 2 shows the course of the pH values and of the conductivity values in the case of the reaction of a calcium hydroxide suspension with phosphoric acid.

In FIG. 2 is shown the course of the pH values and conductivities which results when the phosphoric acid addition has not been broken off at the equivalence point but rather is continued with the same rate of addition.

As is shown by the accompanying curves, in which the pH value and conductivity are in each case temperature-corrected, the pH value in the initial range thereby decreases very slowly and, in the region of the equivalence or neutral point P2, is subject to very strong addition variations. The starting range thereby lies at about pH 10 and, in the region of the equivalence point, decreases slowly to 7.5. A sharp end point is thereby not to be ascertained. In the case of the further addition of phosphoric acid, the pH value first decreases rapidly to 2.5 to 3 and then slowly passes over to the pH value of a dilute phosphoric acid.

In comparison with the starting range, the conductivity decreases from about 6000 to a value of 5000 $\mu S/cm$ and then decreases suddenly to the equivalence point of below 100 $\mu S/cm$. The conductivity minimum P1 corresponds exactly to the equivalence point and can very readily be observed so that this method of measurement is much more useful for controlling the process. In the case of the further addition of phosphoric acid, the conductivity first again increases slowly whereby, apparently due to the formation of tricalcium phosphate, phosphoric acid is partly used up and thus the conductivity does not increase until the achievement of a phosphoric acid concentration which corresponds to a conductivity of about 7000 $\mu S/cm$, dicalcium phosphate being formed which is made noticeable by a further conductivity minimum.

During the reaction, samples are taken and the precipitated product is investigated diffractometrically. In the following Table 1 are given representative reflexes of three samples which are taken at the conductivity minimum P1, at the neutral point P2 (pH 7.0 corresponding to U.S. Pat. No. 4,324,772) and after the ending of the addition of phosphoric acid P3.

According to the diffractogram of Table 1, sample 1 proves to be pure hydroxylapatite. According to Table 1, sample 2 is already hydroxylapatite contaminated with about 20% tricalcium phosphate and sample 3 according to Table 1 is pure dicalcium phosphate.

Figure 3:
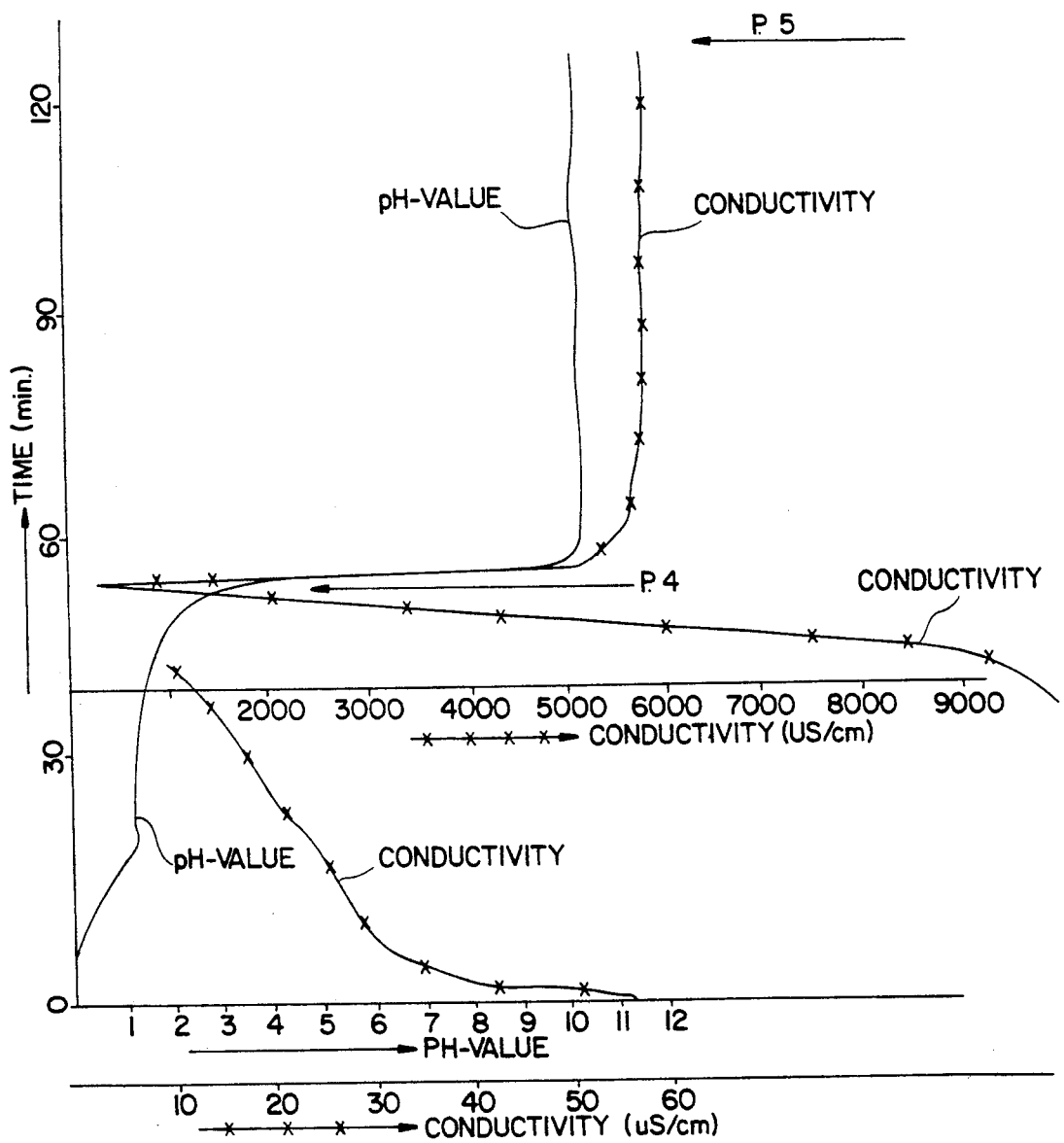
FIG. 3 shows the course of the pH values and conductivity values in the case of the reaction of a phosphoric acid solution with calcium hydroxide.

In FIG. 3 is shown the course of the pH values and conductivities when calcium hydroxide suspension is added continuously to the phosphoric acid solution.

The pH value of the phosphoric acid thereby increases slowly from below 1 to about 3 and then increases rapidly, while dicalcium phosphate precipitates out, to about 10 and thereafter no longer changes.

The conductivity decreases correspondingly, first slowly from about 50000 µS/cm to 9000 µS/cm in order, in the region of the equivalence point for dicalcium phosphate, to decrease rapidly to about 150 µS/cm and, after passing therethrough, again to increase just as quickly to about 5000 µS/cm. Thereafter, it slowly increases further to 6000 µS/cm. A sample 4 taken at the minimum P4 proves to be practically pure dicalcium phosphate (cf. diffractogram in Table 1) and a sample 5 taken at the plateau P5 proves to be a mixture of dicalcium phosphate, calcium oxide and tricalcium phosphate (cf. diffractogram of Table 1). In this way, hydroxylapatite is not formed. However, the conductivity determination and pH measurement are equally suitable in order to monitor the production of pure dicalcium phosphate.

The following Examples are given for the purpose of illustrating the present invention:

EXAMPLE 1

In a mixing vessel with a capacity of 500 liters, which, via a double mantle, can be heated with steam or cooled with water, and which contains a vane stirrer which can be continuously regulated, there are placed 253.98 kg of water and admixed portionwise with 75.24 kg of calcium hydroxide powder. Apart from by means of the incorporated stirrer, homogenization of the mixture also takes place in that a part of the suspension is removed via a run-off in the bottom of the mixing vessel and is pumped round via a bead mill of about 26 liters capacity and with a stirring means of butyl rubber discs with siliquartz pearls (diameter 1.0 to 1.5 mm) and via a return pipe to the mixing vessel. After complete dosing in and homogenization of the calcium hydroxide, 82% phosphoric acid is dosed in portionwise and the suspension thereby again pumped round continuously via the bead mill and ground. The course of the reaction is thereby automatically monitored in the intermediate positioned measurement cell in which pH value, conductivity and temperature are measured.

By thermostating the outer mantle, the temperature in the mixing vessel is maintained during the whole of the reaction in a range of 50° to 70° C.

After reaching the conductivity minimum of 150 µS/cm, the addition of phosphoric acid is stopped. For completion of the reaction, the suspension is pumped around for a further 30 minutes while maintaining the temperature.

After completion of the reaction, the mixing vessel is closed and, by application of a weak vacuum and external heating, converted into a drier. The water vapour led off is freed from dust in a dust filter and thereafter condensed and the amount thereof determined (300 kg).

In this way, 100 kg of hydroxylapatite powder are obtained which, in an X-ray diffractogram, shows no contamination of β-tricalcium phosphate (β-TCP).

In contradistinction thereto, a corresponding hydroxylapatite in which the end point determination was carried out on the basis of the drop of the pH to values below 8, in the X-ray diffractogram are shown as clear bands (at 27.8°, 31.0° and 34.4°), the intensity of which indicates the presence of at least 20% of β-tricalcium phosphate.

EXAMPLE 2

Alternatively to the drying described in Example 1, the suspension can first be mixed with 100 kg of glycerol and evaporated to a water content of about 100 kg, a stable, stirrable and workable suspension thereby being obtained. The grain size distribution in the so obtained suspension corresponds to the values given in the following Table 2.

TABLE 1

| $\Delta.2\Omega$ | P.1 | P.2 | P.3 | P.4 | P.5 | Substance |
|---|---|---|---|---|---|---|
| 26.4 | — | — | 17.0 | 17.0 | — | DCP |
| 27.8 | — | 2.8 | — | — | 3.3 | β-TCP |
| 30.1 | — | — | 11.3 | 12.5 | — | DCP |
| 31.0 | — | 5.5 | — | — | 6.0 | β-TCP |
| 31.7 | 13.8 | 9.3 | — | — | — | HAP |
| 32.1 | 10.8 | 6.6 | — | — | 6.0 | HAP/CaO |
| 32.7 | — | — | 6.7 | 7.2 | — | DCP |
| 32.9 | 8.7 | 5.5 | — | — | — | HAP |
| 34.4 | — | 3.7 | — | — | 4.0 | β-TCP |
| 37.3 | — | — | — | — | 13.2 | CaO |

TABLE 2

| Grain size distribution of HAP (µm) | | |
|---|---|---|
| from | to | % |
| 118 | 33.7 | 0.1 |
| 33.7 | 23.7 | 0.5 |
| 23.7 | 17.7 | 1.9 |
| 17.7 | 13.6 | 0.8 |
| 13.6 | 10.5 | 7.9 |
| 10.5 | 8.2 | 5.2 |
| 8.2 | 6.4 | 4.3 |
| 6.4 | 5.0 | 10.2 |
| 5.0 | 3.9 | 10.4 |
| 3.9 | 3.0 | 11.4 |
| 3.0 | 2.4 | 11.9 |
| 2.4 | 1.9 | 6.3 |
| 1.9 | 1.5 | 4.3 |
| 1.5 | 1.2 | 8.3 |
| 1.2 | 0 | 16.5 |

What is claimed is:

1. A process for the production of an aqueous suspension of hydroxylapatite comprising the steps of:
   a) forming in a vessel, an aqueous solution or aqueous suspension of a calcium compound selected from the group consisting of calcium hydroxide and calcium oxide,
   b) admixing and reacting phosphoric acid with said solution or suspension so as to form a second solution or suspension of hydroxylapatite, said second solution having a calcium/phosphorus mole ratio of up to about 10:6; measuring the conductivity of said second solution or suspension of hydroxylapatite at least periodically during the reaction so as to determine the progress of the reaction and the completion of the reaction, and ending the admixing of the phosphoric acid when the conductivity of the reacting solution has decreased to less than about 10% of the initial value of the conductivity before the addition of the phosphoric acid.

2. A process of claim 1, wherein said admixing of said phosphoric acid is ended after said conductivity has decreased to less than about 5% of said initial value of the conductivity.

3. A process of claim 1, wherein said admixing of said phosphoric acid is ended when said conductivity of the reacting solution reaches a predetermined minimum corresponding to the equivalence point.

4. A process of claim 1, additionally comprising the step of separating water from the hydroxylapatite aqueous suspension so as to form dried, solid hydroxylapatite.

5. A process of claim 1, additionally comprising the step of:
c) adjusting the pH value of said hydroxylapatite aqueous suspension to about 7.0 to about 7.5 by the addition of phosphoric acid after completion of the reaction.

6. A process of claim 1, wherein said aqueous solution or aqueous suspension of said calcium compound of step a) comprises about 20 to about 40% by weight of said calcium compound.

7. A process of claim 6, wherein the concentration of said phosphoric acid of step b) is between about 60 and 85%.

8. A process of claim 1, wherein step b) comprises introducing portionwise or continuously over a period of about 1 to about 5 hours, said phosphoric acid.

9. A process of claim 8, wherein said phosphoric acid of step b) comprises a 60 to 85% concentration of phosphoric acid in water.

10. A process of claim 1, wherein the reaction is carried out at a temperature of about 40° to about 90° C.

11. A process of claim 1, wherein the conductivity measurement in step b) is carried out by drawing off a portion of the reacting second solution from the vessel and measuring the conductivity of the drawn-off portion, and returning the drawn-off portion to the reaction vessel.

12. A process of claim 11, further comprising grinding the drawn-off portion by means of a mill before returning the drawn-off portion to the vessel.

13. A process of claim 11, wherein said admixing of phosphoric acid is ended when the conductivity of the drawn-off portion is at a predetermined minimum value corresponding to the equivalence point.

14. A process of claim 3, further comprising drying the hydroxylapatite after said conductivity is at a predetermined minimum value corresponding to the equivalence point so as to produce substantially pure hydroxylapatite powder.

15. A process of claim 1, wherein step b) additionally comprises measuring the pH, the temperature, or both, of the second solution, to determine the progress and the completion of the reaction.

16. A process of claim 1, further comprising drying the hydroxylapatite by spray drying or vacuum drying so as to obtain the hydroxylapatite as a dry fine powder.

17. A process of claim 1, further comprising adding a stabilizing agent to the hydroxylapatite aqueous suspension, and evaporating the hydroxylapatite aqueous suspension to obtain the desired end concentration.

18. A process of claim 17, wherein said stabilizing agent is glycerol and said desired end concentration is about 30 to about 50%.

19. A process of claim 1, wherein said calcium compound is a technical grade product.

* * * * *